(12) United States Patent
Franke et al.

(10) Patent No.: US 8,149,550 B2
(45) Date of Patent: Apr. 3, 2012

(54) PROTECTIVE DEVICE HAVING A CIRCUIT BREAKER, IN PARTICULAR A LOW-VOLTAGE CIRCUIT BREAKER

(75) Inventors: Henry Franke, Berlin (DE); Jeffery C. Mizener, Euless, TX (US); Ilka Redmann, Falkensee (DE)

(73) Assignee: Siemens Aktiengesellschaft, Munich (DE)

( * ) Notice: Subject to any disclaimer, the term of this patent is extended or adjusted under 35 U.S.C. 154(b) by 620 days.

(21) Appl. No.: 12/223,122

(22) PCT Filed: Dec. 27, 2006

(86) PCT No.: PCT/EP2006/070218
§ 371 (c)(1),
(2), (4) Date: Jul. 23, 2008

(87) PCT Pub. No.: WO2007/082631
PCT Pub. Date: Jul. 26, 2007

(65) Prior Publication Data
US 2009/0027815 A1    Jan. 29, 2009

(30) Foreign Application Priority Data
Jan. 23, 2006 (DE) .................. 10 2006 004 800

(51) Int. Cl.
*H02H 3/00* (2006.01)
(52) U.S. Cl. .................................... 361/35; 361/44
(58) Field of Classification Search ............ 361/93.6, 361/35, 47, 48, 64, 87
See application file for complete search history.

(56) References Cited

U.S. PATENT DOCUMENTS
3,660,739 A * 5/1972 Okuyama et al. .......... 318/768
(Continued)

FOREIGN PATENT DOCUMENTS
DE  877 473  5/1953
(Continued)

OTHER PUBLICATIONS

Cossé, R. E. et al.; "The Practice of Ground Differential Relaying", IEEE Transactions on Industry Applications, IEEE Service Center, Piscataway, Bd. 30, No. 6, pp. 1472-1479, NY, 0093-9994, Others, 1994, US. Rajamani, K.; "Restricted Earth Protection Practices"; IEEE Journal, Bd. 26, No. 1, pp. 92-93, XP008077023, Bombay, 0970-2949, Others, 2006, IN.

*Primary Examiner* — Stephen W Jackson
*Assistant Examiner* — Angela Brooks
(74) *Attorney, Agent, or Firm* — Harness, Dickey & Pierce, P.L.C.

(57) ABSTRACT

A protective device is disclosed having a circuit breaker for an electrical connection between a transformer and a load, wherein an overcurrent device is arranged between the transformer and the load. The overcurrent device has first magnetoelectric transducers arranged at each phase conductor and the neutral conductor, wherein the overcurrent device uses the transducer currents to in each case establish the presence of a first ground-fault current, and wherein the circuit breaker has a switching device, which interrupts at least the phase conductors between the transformer and the load in the event of the presence of a first ground-fault current (unrestricted earth fault). In order to also be able to determine the ground fault current between the transformer and the circuit breaker, at least one embodiment of the invention proposes providing in each case second magnetoelectric transducers at each phase conductor, the neutral conductor and a star-point conductor which is connected to the star point, using the transducer currents of the second transducer in each case to determine the presence of a second ground-fault current (restricted earth fault), and forming a signal for disconnecting the transformer in the event of the presence of a second ground-fault current.

17 Claims, 1 Drawing Sheet

U.S. PATENT DOCUMENTS

| | | | |
|---|---|---|---|
| 4,011,483 A * | 3/1977 | Meadows | 361/47 |
| 4,110,808 A * | 8/1978 | Hobson et al. | 361/44 |
| 4,853,819 A * | 8/1989 | Suwa et al. | 361/47 |
| 5,751,524 A * | 5/1998 | Swindler | 361/42 |
| 5,963,404 A | 10/1999 | Guzman-Casillas et al. | |
| 6,243,276 B1 | 6/2001 | Neumann | |
| 6,249,230 B1 * | 6/2001 | Baldwin et al. | 340/650 |
| 7,227,347 B2 * | 6/2007 | Viaro et al. | 324/117 H |
| 7,301,739 B2 * | 11/2007 | Hamer | 361/42 |
| 7,995,315 B2 * | 8/2011 | Riley et al. | 361/44 |
| 2002/0024782 A1 * | 2/2002 | Kim et al. | 361/42 |
| 2010/0008000 A1 * | 1/2010 | Riley et al. | 361/44 |

FOREIGN PATENT DOCUMENTS

| | | |
|---|---|---|
| DE | 199 63 450 | 11/2000 |
| DE | 102 61 837 | 3/2004 |
| EP | 0 446 951 | 9/1991 |
| EP | 1 335 470 | 8/2003 |
| GB | 443218 | 2/1936 |
| GB | 541172 | 11/1941 |
| GB | 542804 | 1/1942 |
| WO | WO 2004/040732 | 5/2004 |

\* cited by examiner

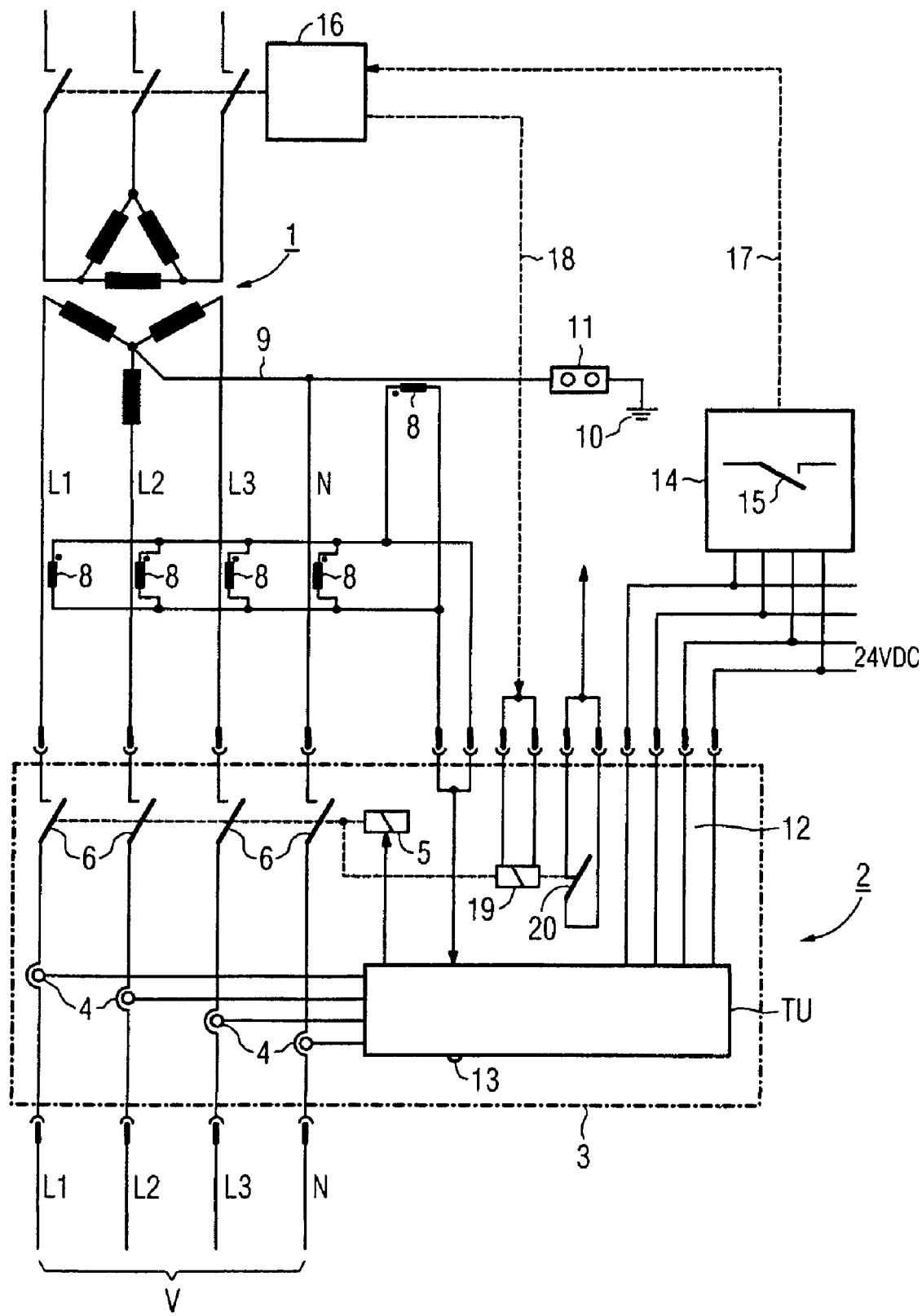

PROTECTIVE DEVICE HAVING A CIRCUIT BREAKER, IN PARTICULAR A LOW-VOLTAGE CIRCUIT BREAKER

PRIORITY STATEMENT

This application is the national phase under 35 U.S.C. §371 of PCT International Application No. PCT/EP2006/070218 which has an International filing date of Dec. 27, 2006, which designated the United States of America, and which claims priority on German patent publication DE 10 2006 004 800.8, filed Jan. 23, 2006, the entire contents of which are hereby incorporated herein by reference.

FIELD

At least one embodiment of the invention relates to a protective device having a circuit breaker, in particular a low-voltage circuit breaker.

BACKGROUND ART

It is known to provide low-voltage circuit breakers with overcurrent releases, which can also include protection against ground faults in addition to protection against overloads and short circuits. The determination of the ground-fault current can take place via the formation of the phasor sum of the phase currents or else the ground-fault current flowing back towards the feed is measured by means of a transducer. In this case, however, only the ground-fault current flowing through the circuit breaker (unrestricted earth fault) can be determined.

In installation applications, however, it may be necessary to also determine a ground fault between the feed (medium-voltage transformer) and the circuit breaker (restricted earth fault) in addition to the ground-fault current flowing through the low-voltage circuit breaker.

SUMMARY

At least one embodiment of the invention specifies a protective device having a circuit breaker which can also determine the ground-fault current between the feed (transformer) and the circuit breaker (restricted earth fault).

The solution envisages that in each case second magnetoelectric transducers are provided simultaneously between the star connection of the transformer and the overcurrent device on each phase conductor, the neutral conductor and a star-point conductor, which is connected to ground and is connected at the star point, that in each case the presence of a second ground-fault current is determined using the transducer currents of the second transducers, and that, in the event of the presence of a second ground-fault current, a signal for disconnecting the transformer is formed. In the event of detection of a ground-fault current, a message in the form of a signal is now generated by the overcurrent device (by the "overcurrent release"), and this message can be used to disconnect the transformer or the feed. The monitoring of ground faults between the transformer (the feed) and the circuit breaker can in this case easily be integrated into the overcurrent device of the circuit breaker as a side effect.

The safety of the protective device can be improved if, in the event of the presence of a first and/or a second ground-fault current, the value of said ground-fault current is determined in each case, and if the interruption in the event of the presence of a first ground-fault current or the disconnection in the event of the presence of a second ground-fault current only takes place if this value in each case exceeds a predetermined limit value.

A simple protective device provides that the second transducers are connected to one another in such a way that a residual current is formed.

It is technically simple if the second transducers have coils as the sensor elements.

In a simple embodiment, all of the coils of the second transducers are connected in parallel.

Expediently, the determination of the ground-fault current in each case takes place using the residual current or using the phasor sum of the phase currents.

In an operation-friendly protective device, the signal for disconnecting the transformer is displayed optically.

In terms of control technology it is simple if the signal for disconnecting the transformer is output via a bus, which in turn is connected to a relay module, which triggers the disconnection of the transformer by means of its relay contacts when the signal for disconnecting the transformer is present.

A compact configuration provides that the phase conductors and the neutral conductor run through the circuit breaker, and the signal for disconnecting the transformer is displayed optically on the circuit breaker.

It is yet more operation-friendly if during and/or after disconnection of the transformer, a feedback signal is generated and is displayed optically on the circuit breaker.

BRIEF DESCRIPTION OF THE DRAWING

An embodiment of the invention will be described in more detail below with reference to the drawing.

The single FIGURE shows, in a schematic illustration, a transformer of an example embodiment.

DETAILED DESCRIPTION OF THE EXAMPLE EMBODIMENT

The single FIGURE shows, in a schematic illustration, a transformer 1 (in this case a medium-voltage transformer), which is operated on the secondary side in star-connected fashion and is connected to a load V via phase conductors L1, L2, L3 and a neutral conductor N.

Furthermore, the FIGURE shows a protective device 2, which includes a circuit breaker 3. The phase conductors L1, L2, L3 and the neutral conductor N are passed through the circuit breaker 3.

The circuit breaker 3 has an overcurrent protective device, whose magnetoelectric transducers 4 are shown in FIG. 4. The transducers 4 are coils which include the associated conductors L1, L2, L3, N in each case and act as sensor elements for the currents flowing through the conductors L1, L2, L3, N. All of the transducers 4 are electrically connected to a central processor unit TU (Trip Unit), which has a software-controlled processor (not illustrated).

Each transducer 4 emits a corresponding transducer current to the processor unit TU, which establishes the presence of a ground-fault current using the transducer currents in relation to the FIGURE below the circuit breaker 3 (first ground-fault current, unrestricted earth fault). The determination of the ground-fault current takes place in each case using the residual current (or using the phasor sum) of the phase currents detected via the transducers 4.

Furthermore, the circuit breaker has a switching device whose tripping magnet 5 is illustrated in the FIGURE. The tripping magnet 5 actuates a switch with a plurality of switch contacts 6 in the event of the presence of a ground-fault current in order to interrupt the phase conductors L1, L2, L3 between the transformer 1 and the load V. As shown in the FIGURE, in this case the neutral conductor N is also interrupted. The activation of the tripping magnet 5 takes place by means of a tripping signal emitted by the processor unit (TU), which is illustrated schematically here as arrow 7.

The protective device also includes further magnetoelectric transducers 8, which are illustrated above the circuit breaker 3 in the FIGURE and, similarly to the transducers 4, surround the associated conductors L1, L2, L3, N and in addition here the star-point conductor 9, which is connected to the star point of the star connection and to ground 10, the element 11 in the FIGURE schematically illustrating a releasable connection to ground 10. The transducers 8 are in the form of coils, which are all connected in parallel. The interconnection makes it possible to form a corresponding residual current and to determine the occurrence of a ground-fault current using the residual current. (Of course the ground-fault current could also be determined using the phasor sum of the phase currents).

The FIGURE shows that the interconnected transducers 8 are connected to the processor unit TU. In order to evaluate the transducer currents, in this case the same algorithm is used as for the transducer currents of the transducers 4.

If the presence of a ground-fault current (second ground-fault current, restricted earth fault) is determined using the transducer currents of the transducers 8, the processor unit TU generates a signal for disconnecting the transformer 1, which signal is output via a bus 12. At the same time, the signal is displayed via an optical display 13 on the circuit breaker 3.

The bus 12 is connected to a module 14, which, when the signal for disconnecting the transformer 1 is output, triggers the disconnection of the transformer 1 via the switching unit 16 by way of its contacts 15 (connecting line 17), in which case the module 14 may also be a relay module with its relay contacts. After disconnection of the transformer 1, the unit 16 generates a feedback signal, which is fed back to the circuit breaker 3 (connecting line 18). Using this fed-back signal, a further tripping magnet 19 is switched, which tripping magnet opens the switch contacts 6, to be precise independently of the tripping magnet 5. In this case, a microswitch 20 is opened, with the result that the disconnection of the transformer and the position of the switch contacts 6 can be interrogated. This can also be displayed optically on the circuit breaker 3.

The interruption or the disconnection in the event of the presence of a ground-fault current only takes place if this value in each case exceeds a predetermined limit value.

The protective function for this ground-fault current (restricted earth fault) can likewise be parameterized with respect to the response values and the delay times in the overcurrent device, using the interfaces of the circuit breaker 3. This can also take place via the bus 12, via which remote diagnosis is also possible.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A protective device, comprising:
a circuit breaker for an electrical connection of a transformer to a load, the transformer being operated on the secondary side in star-connected fashion, and the electrical connection taking place via at least three phase conductors and a neutral conductor; and
an overcurrent device, arranged between the transformer and the load and between a first switching device and the load, the overcurrent device including first magnetoelectric transducers arranged on each phase conductor and the neutral conductor between the first switching device and the load, the transducers each being arranged to emit a transducer current, the overcurrent device in each case establishing the presence of a first ground-fault current using the transducer currents, the first switching device to interrupt at least the phase conductors between the transformer and the load in the event of the presence of a first ground-fault current, second magnetoelectric transducers being provided between the star connection and the first switching device on each phase conductor, the neutral conductor and a star-point conductor connected at the star point, the star-point conductor being connected to ground, wherein the presence of a second ground-fault current is determined using the transducer currents of the second transducers, and wherein, in the event of the presence of a second ground-fault current, a signal for disconnecting the transformer is formed, said overcurrent device including a second switching device on the primary side of the transformer, which is tripped by the signal.

2. The protective device as claimed in claim 1, wherein, in the event of the presence of at least one of the first and the second ground-fault current, the value of the ground-fault current is determined, and wherein at least one of the interruption, in the event of the presence of the first ground-fault current, and the disconnection, in the event of the presence of the second ground-fault current, only takes place if this value exceeds a predetermined limit value.

3. The protective device as claimed in claim 1, wherein the second transducers are connected to one another in such a way that a residual current is formed.

4. The protective device as claimed in claim 1, wherein the second transducers include coils as the sensor elements.

5. The protective device as claimed in claim 4, wherein all of the coils of the second transducers are connected in parallel.

6. The protective device as claimed in claim 1, wherein the determination of the ground-fault current in each case takes place using at least one of the residual current and the phasor sum of the phase currents.

7. The protective device as claimed in claim 1, wherein the signal for disconnecting the transformer is displayed optically.

8. The protective device as claimed in claim 1, wherein the signal for disconnecting the transformer is output via a bus, which in turn is connected to a module, which triggers the disconnection of the transformer by means of its contacts when the signal for disconnecting the transformer is present.

9. The protective device as claimed in claim 1, wherein the phase conductors and the neutral conductor run through the circuit breaker, and the signal for disconnecting the transformer is displayed optically on the circuit breaker.

10. The protective device as claimed in claim 9, wherein, at least one of during and after disconnection of the transformer, a feedback signal is generated and is displayed optically on the circuit breaker.

11. The protective device as claimed in claim 1, wherein the circuit breaker is a low-voltage circuit breaker and wherein the transformer is a medium-voltage transformer.

12. The protective device as claimed in claim 2, wherein the second transducers are connected to one another in such a way that a residual current is formed.

13. The protective device as claimed in claim 2, wherein the second transducers include coils as the sensor elements.

14. The protective device as claimed in claim 3, wherein the second transducers include coils as the sensor elements.

15. The protective device as claimed in claim 13, wherein all of the coils of the second transducers are connected in parallel.

16. The protective device as claimed in claim 14, wherein all of the coils of the second transducers are connected in parallel.

17. The protective device as claimed in claim 1, wherein the overcurrent device is arranged in the circuit breaker.

* * * * *